Nov. 15, 1966  J. A. NEELY, JR  3,285,358
TOWING VEHICLE FOR TRAILERS
Filed Oct. 30, 1963  3 Sheets-Sheet 1

INVENTOR.
JOHN ALEXANDER NEELY, JR.
BY
B. P. Fishburne, Jr.
ATTORNEY

INVENTOR.
JOHN ALEXANDER NEELY, JR.
BY
ATTORNEY

Nov. 15, 1966      J. A. NEELY, JR      3,285,358
TOWING VEHICLE FOR TRAILERS
Filed Oct. 30, 1963      3 Sheets-Sheet 3
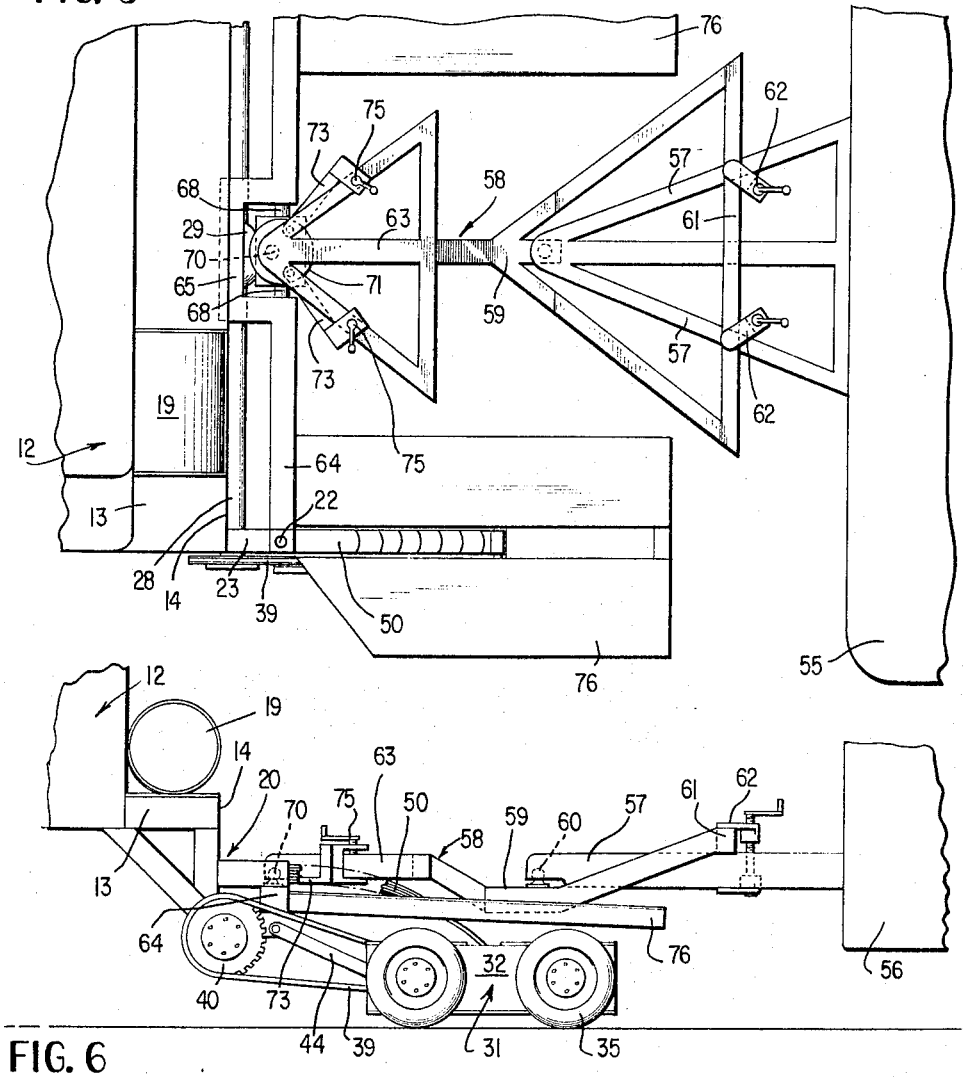
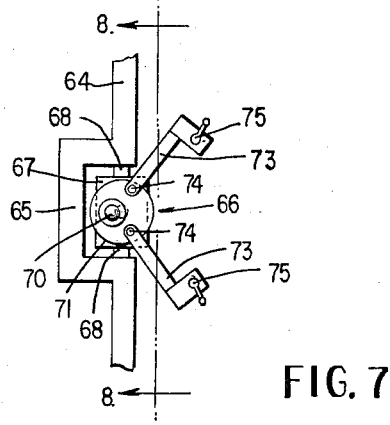
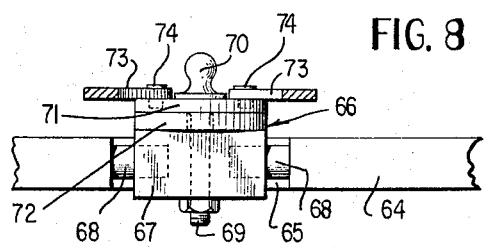
INVENTOR.
JOHN ALEXANDER NEELY, JR.
BY
*B. P. Fishburne, Jr.*
ATTORNEY

United States Patent Office 3,285,358
Patented Nov. 15, 1966

3,285,358
TOWING VEHICLE FOR TRAILERS
John Alexander Neely, Jr., P.O. Box 273,
Anderson, S.C.
Filed Oct. 30, 1963, Ser. No. 320,103
10 Claims. (Cl. 180—11)

This invention relates to a towing vehicle for house trailers and the like.

Certain mobile homes and other like trailers of a type commonly drawn by automobiles present peculiar problens for towing on highways with adequate safety, stability and control. As is well known, house trailers are becoming increasingly large, heavy and of great length and commonly have relatively low ground clearance. They are provided at their forward end with a horizontal tongue or A-frame for connection with a suitable hitch on the towing truck or vehicle. Relatively small size trailers may be safely towed by the use of a conventional bumper hitch on the rear bumper of an automobile or other vehicle. It is practically impossible to tow safely the larger type mobile homes and trailers by this means due to the excessive weight and the resultant lack of stability and control where the weight of the trailer is concentrated on the rear bumper or the like and rearwardly of the rear wheels of the towing vehicle. These arrangements create a serious safety hazard on the highway particularly at high speeds.

In recent years the larger type mobile homes and trailers have been transported on highways by conventional or modified trailer truck tractors having conventional full size wheels, usually about twenty inches in diameter and conventional height main frames which are spaced about two feet above the ground and substantially above the elevation of the trailer tongue or A-frame. This renders it impossible to connect or hitch the trailer tongue to the elevated frame of the tractor and various hitch devices must be added to the rear of the tractor at a suitable low elevation, rearwardly of the rear tractor wheels. These arrangements continue to fail to solve the above-mentioned problems of stability and control and they render the overall length of the caravan excessively long, awkward and difficult to control, particularly at highway speeds. Other solutions to the problem have been proposed, including the provision of auxiliary axles on the towing truck or trailer and dollies arranged intermediate the truck and trailer and formed separately from both and such arrangements are expensive and tend to compound the problem rather than solve it and increase the length of the caravan to an even greater extent.

Accordingly, the main project of this invention is to solve the aforementioned problems incident to transporting large trailer homes and the like having drawing tongues or A-frames at a low elevation. According to the invention, this is accomplished through the provision of a modified towing truck or tractor having a modified power train and a depressed main frame portion and special low elevation rear traction means capable of underlying the trailer body and the tongue or A-frame.

The ground-engaging wheels of the rear traction means are considerably smaller in diameter than the aforementioned conventional full size truck wheels. The relative proportions of the wheels are clearly indicated in the accompanying drawings. The low elevation rear traction means is also distinctly split or divided into two rather widely spaced units which are capable of straddling and passing on opposite sides of the support leg which is commonly employed to hold up the trailer A-frame when the trailer is at rest and not coupled to any towing tractor.

A more specific object is to provide a towing vehicle for trailers which may be manufactured by cutting off the main frame of a conventional truck or trailer truck tractor just rearwardly of the transmission and dropping the rear axle housing and differential and mounting the same on a depressed frame extension which may be welded or otherwise secured to the elevated main frame of the tractor. A foreshortened drive shaft is employed between the transmission and the lowered differential and the latter is placed close to the transmission. The vehicle further includes relatively low small diameter wheel spring-loaded traction units rearwardly of the differential and axle housing and powered therefrom and adapted to underlie the trailer tongue or A-frame. The hitch structure which receives the weight of the trailer transmitted through the A-frame is placed well forwardly of the low traction units and on the rigid depressed tractor frame extension to provide increased stability and greater control of the trailer, greater strength and increased safety. The arrangement also materially shortens the overall length of the caravan on the highway. Provision is also made in the invention for hauling certain trailers having exceedingly low ground clearance or a shorter than standard A-frame or tongue, according to a modification.

Other objects and advantages of the invention will be apparent during the course of the following detailed description.

In the accompanying drawings forming a part of this application and in which like numerals are employed to designate like parts throughout the same, FIGURE 1 is a plan view of the invention, parts broken away, FIGURE 2 is a side elevation thereof, FIGURE 3 is an enlarged fragmentary plan view showing one tractor unit and associated elements, FIGURE 4 is a longitudinal vertical section taken on line 4—4 of FIGURE 3, FIGURE 5 is a fragmentary plan view showing a modification of the invention.

FIGURE 6 is a side elevation of the same,

FIGURE 7 is a fragmentary plan view of a hitch structure employed in said modification and also capable of use in the preferred form of the invention, and FIGURE 8 is an enlarged fragmentary transverse vertical section taken on line 8—8 of FIGURE 7.

Figure 1:
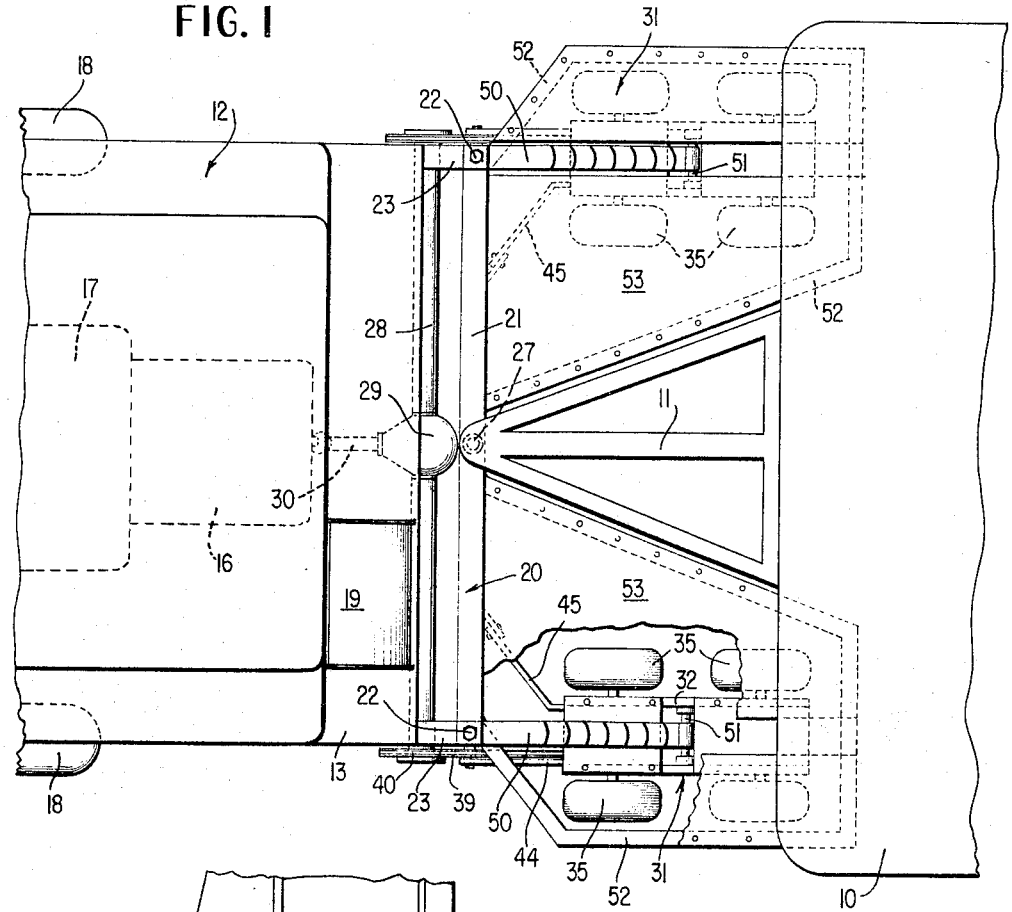
Figure 2:
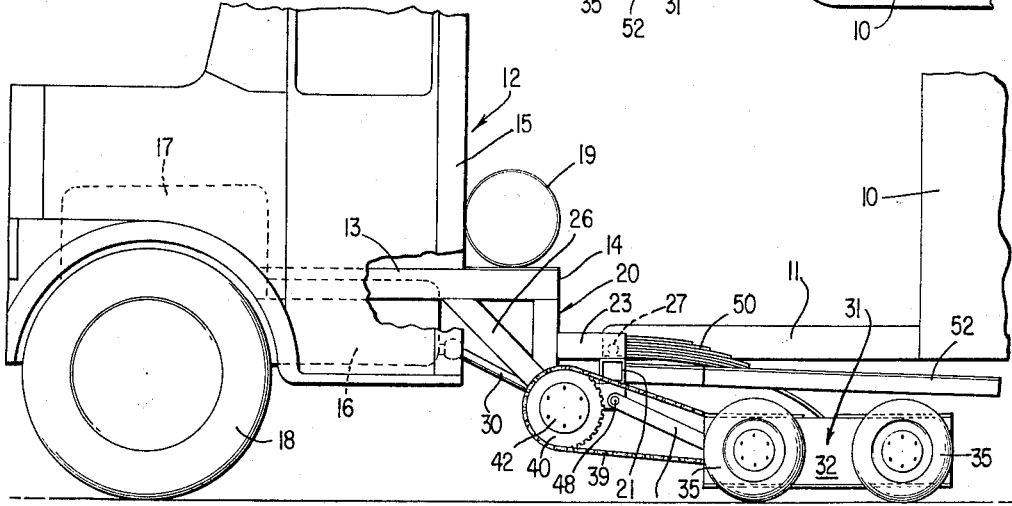

In the drawings, wherein for the purpose of illustration are shown preferred embodiments of the invention, attention being directed first to FIGURES 1 to 4 inclusive, the numeral -10 designates the body of a house trailer or the like having relatively low ground clearance and having a forwardly projecting horizontal tongue or A-frame 11 spaced about sixteen inches above the ground in many cases. It is to be observed that this distance or elevation is considerably less than the usual height of the main frame of a towing tractor having standard size wheels as before mentioned and giving rise to the problem which is solved by the invention.

The towing truck or tractor 12 embodying the invention comprises a foreshortened main frame 13 of standard height above the ground and considerably higher than the trailer A-frame 11 and the main frame of the trailer body. The main frame 13 of the tractor is cut off at 14 just rearwardly of the usual cab 15 and the usual transmission 16 positioned approximately as shown in conjunction with the truck engine 17. The tractor 12 has full size front wheels 18 and in other respects the tractor or truck may be standard in construction from its transmission forwardly and this standard construction need not be dealt with in further detail. Provision may be made for a gas tank 19 on the main frame 13 just rearwardly of the cab or other conventional means may be employed to mount the gas tank or other accessories.

A depending or depressed rear frame extension 20 is welded or otherwise rigidly secured to the rear of the foreshortened tractor main frame 13 and this frame extension comprises a sturdy horizontal transverse cross beam 21 having its opposite ends securely bolted at 22 between pairs of short horizontal rearwardly projecting arms 23 and 24, rigid with depending vertical braces 25 and diagonal braces 26 having their tops secured by welding or the like to the elevated main frame 13. The construction of the depressed frame extension 20 is very sturdy and rigid and the cross beam 21 is arranged substantially below the elevation of the main frame 13 and as close as possible to the transmission 16 and at a proper elevation to underlie and support the horizontal A-frame 11 of the trailer. The beam 21 is equipped at its center with any preferred type of trailer hitching device 27, such as the well known ball type hitch, for coaction with a hitching socket or means on the forward end of the trailer A-frame 11, as shown. The beam 21 thus constitutes the hitching bar of the tractor and bears the weight of the trailer coupled thereto through the A-frame 11 and hitch device 27.

The rear axle housing 28 and differential 29 constituting a unit which may be the same unit cut from the standard towing tractor is bodily mounted upon the bottom of the depressed frame 20 and has its opposite ends suitably rigidly anchored to the braces 24 and 26 substantially directly below the rear of main frame 13 and just forwardly of and below the beam or hitch bar 21. A foreshortened drive shaft 30 with suitable universal joints serves to interconnect the transmission driven shaft and the input shaft to the differential 29, which in turn drives the axle sections within the housing 28 in the usual manner. It will be observed that the differential 29 and axle housing 28 is arranged much closer to the transmission 16 and at a slightly lower elevation than in a standard truck or tractor.

In trailing relation to the depressed frame extension 20 at the opposite sides thereof are a pair of identical low silhouette four wheel drive traction units or carriages 31 whose heights are such that they may engage under and clear the bottom of the trailer body 10 and A-frame 11 during straightway travel and during turning without interference. The traction units 31 are distinctly separated laterally as shown in FIGURE 1 so as to be capable of straddling the fixed leg which normally supports the trailer A-frame 11 when the trailer is parked and disconnected from any tractor or truck.

Each traction unit 31 preferably comprises an elongated channel-like rigid frame 32 upon which is journaled for rotation near the opposite ends thereof a pair of relatively short transverse horizontal axles 33 and 34 carrying pneumatic tired traction wheels 35 which are about twelve inches in diameter. The axles 33 and 34 of each unit 31 are drivingly interconnected by horizontal sprocket chain 36 engaging sprocket gears 37 and 38 on said axles. The forward axle 33 of each traction unit 31 is powered or driven by another endless sprocket chain 39 or the like engaging a larger diameter sprocket gear 40 on each driven axle section of the axle housing 28, and arranged at each end of this axle housing, outboard of the frame extension 20. The driven axle sections 41 may have flanges 42 for direct bolting at 43 to the large sprocket gears 40 to assure turning thereof by the differential 29.

The frame 32 of each traction unit is stabilized by longitudinal and diagonal radius rods 44 and 45 having their rear ends pivoted at 46 and 47 to the sides of the frame 32, and their forward ends pivoted at 48 and 49 to the frame arms 24 and beam 21, respectively. These radius rods allow relative movement vertically between the traction units 31 and frame 20 and keep the traction units properly aligned and parallel and prevent lateral displacement thereof.

Springs 50 are provided to yieldingly resist upward movement of the traction units 31 and to yieldingly connect these units with the frame 20 and each of these springs has the forward end portions of its leaves securely anchored within the horizontal arms 23 which are box-like in cross section. The socketed forward ends of the springs 50 may be anchored by the same bolt 22 utilized to secure the beam or hitch bar 21. The springs 50 are thus positioned at the opposite sides of the frame 20 and they extend rearwardly over the centers of the traction units and have their rear ends or shackles suitably connected with horizontal cross shafts 51 spanning the frame 32 transversely near the tops thereof as shown best in FIGURES 3 and 4. The rear ends of the springs 50 are thus connected with the units 31 at the transverse and longitudinal centers of the same and centrally of the four traction wheels of each unit. The front wheels 18 of the tractor 12 have conventional suspension springs, not shown.

Above each traction unit 31 and between the same and the bottom of the trailer body and A-frame 11 is a fender or buffer frame 52 formed of sturdy angle bars or the like and having its forward end rigidly secured by welding to the hitch bar 21 and bodily carried thereby. These buffer frames 52 are sufficiently sturdy to bear the weight of the forward end of the trailer should the A-frame 11 ever be brought to rest upon one of frames 52. These frames 52 are preferably covered with sections of sheet metal 53 or the like to serve as mud guards above the traction wheel units 31. The sheet metal sections 53 have slots 54 to accommodate the springs 50, as shown. As shown in the drawings, the frames 52 are spaced laterally or separated so that the leg, not shown, employed to support the A-frame 11 when the trailer is parked can pass between the frames.

During towing of the trailer, the weight thereof is transmitted through the A-frame 11 to the depressed beam or hitch bar 21 well forwardly of the low silhouette traction wheel units 31. These units and the buffer frames 52 above them are sufficiently low to clear the A-frame and trailer body during all turning operations. The springs 50 provide independent suspension for the four wheel drive traction units and the radius rods 44 and 45 allow rising and falling of the traction units on rough terrain and fully stabilize the same. Power is transmitted directly from the transmission 16 to the differential 29 in the usual manner and from the differential and axle sections 41, FIGURE 4, to the sprocket gears 24. From these sprocket gears and through the chains 39, power is applied directly to the front axles 33 carrying smaller chain-engaging sprocket gears 39', not previously mentioned. The rear axles 34 are in turn indirectly driven from the front axles through the chains 36 and associated elements. It should be understood that other conventional types of gearing could be employed between the differential and axle housing 28 and the wheels of traction units 31, within the scope of the invention.

In light of the foregoing description and objects and discussion of the prior art, it is believed that the advantages of the invention will be readily apparent to those skilled in the art without the need for further description.

In FIGURES 6–8, there is shown a modification of the invention to transport trailers and the like having extremely low main frame or ground clearance, the bottom of such a trailer 55 being indicated at 56 in FIGURE 6. With the horizontal A-frame or tongue 57 located at the elevation indicated, it would not be possible to couple the A-frame 57 to the hitch 27 of the preferred embodiment because the trailer bottom 56 would not clear the low traction units 31.

To overcome this problem in the case of extremely low trailers, an extension frame 58 is arranged intermediate the depressed frame extension 20 of tractor 12 and the A-frame 57 of the low bottom trailer 55. The tractor 12 per se including the traction units 31 and depressed frame extension 20 and associated parts remain substantially the same as in the prior embodiment and need not again be described in full detail.

The extension frame 58 has a central depressed portion 59 intermediate its ends and underlying the front of A-frame 57 and having a ball hitch 60 or the like for coupling engagement with the A-frame 57. The rear portion 61 of extension frame 58 is somewhat elevated and arranged above and across the A-frame 57 of the trailer intermediate the trailer body and the traction units 31. Adjustable screw-threaded clamping means 62 are provided upon the rear of extension frame 58 to clampingly secure the latter rigidly to the sides of A-frames of various thickness. In this manner, the extension frame 58 is rendered rigid with the trailer A-frame 57 and the trailer body is held well rearwardly of the traction means 31.

The forward portion 63 of extension frame 58 is somewhat elevated and is preferably at the elevation of the trailer A-frame 57, FIGURE 6. At its forwardmost end, the extension frame 58 is adapted in the same manner as the A-frame 57 to be coupled with suitable hitching means on the depressed frame extension 20 of the tractor.

As shown particularly in FIGURES 7 and 8, the main transverse horizontal beam or hitch bar 64 corresponding to the hitch bar 21 of the prior embodiment is modified by being forwardly offset at 65 in its center portion. The purpose of this is to accommodate a modified type of hitch unit 66 similar to the so-called "fifth wheel" of large trailer tractors. The hitch unit 66 embodies a body portion or block 67 having rigid side arm extensions 68 socketed therein and secured by welding or the like to the main hitch bar 64 within the forwardly offset area of the same. The block 67 has a central vertical opening for a bolt 69 having a ball hitch 70 integral with the top thereof and an intermediate plate 71 also rigid with the bolt and resting upon the block 67. That is to say, the plate 71, ball hitch 70 and bolt 69 constitute a unit separate from the fixed block 67 and turnable upon a vertical axis relative thereto. The block 67 may also have an integral circular top plate portion 72, upon which the plate 71 rests and turns. The forward end of extension frame 58 has socketed engagement over the ball hitch 70, in the usual manner, and the weight of the trailer is borne at this point and forwardly of the traction units 31 as in the prior embodiment. A pair of arms 73 are pivoted at 74 to the turnable plate 71 near opposite sides thereof and these arms underlie the forward extension frame portion 63 and carry adjustable screw-threaded clamps 75 which are swingable with the arms into proper positions to engage and rigidly clamp the opposite sides of the forward portion of extension frame 58, as shown. The entire extension frame 58, together with the A-frame 57 clamped thereto, is swingable horizontally during vehicle turning about the vertical axis of the hitch bolt 69 and ball 70 and, as stated, the bearing plate 71 is also turnable upon the plate surface 72. If desired, this same form of hitch structure may also be used in lieu of the hitch 27 in the first form of the invention.

In FIGURES 5 and 6, the mud guards 76 or buffer frames are slightly modified as shown to provide additional turning clearance between them for the depressed portion 59 of the extension frame 58, in such cases where this portion must be below the mud guards as indicated in FIGURE 6. If desired, the mud guards 76 of this embodiment may be omitted entirely from the structure.

All other parts of the invention structure in the modification may be identical to the corresponding parts shown and described in the preferred embodiment. The modification structure possesses generally the same features and advantages of the preferred form but is designed specifically to accommodate the unusually low bottom trailers, as stated.

Figure 3:
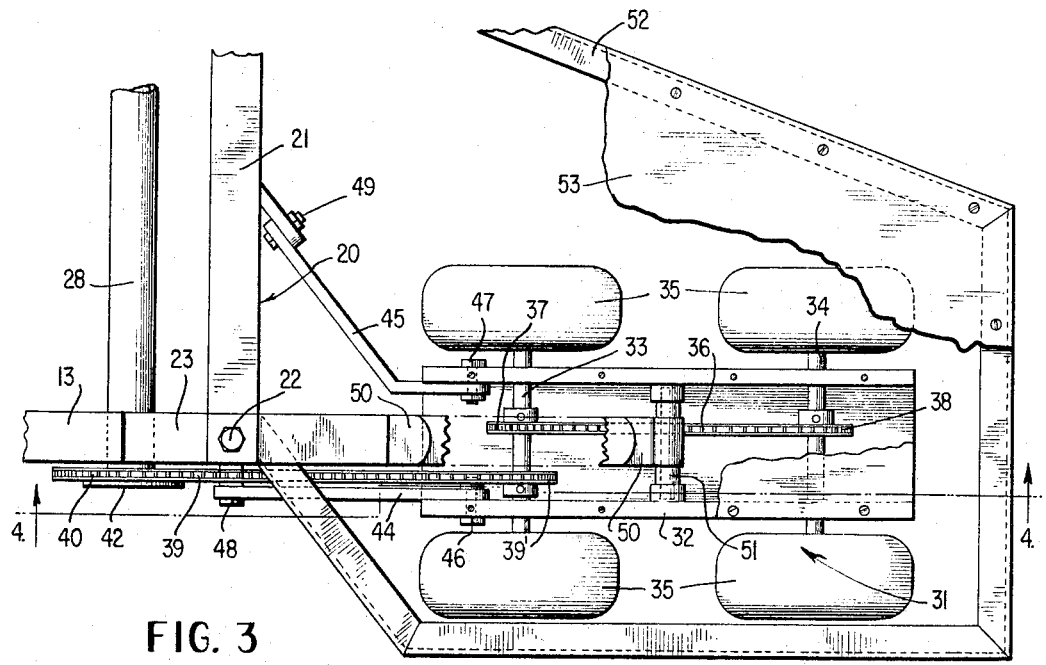
Figure 4:
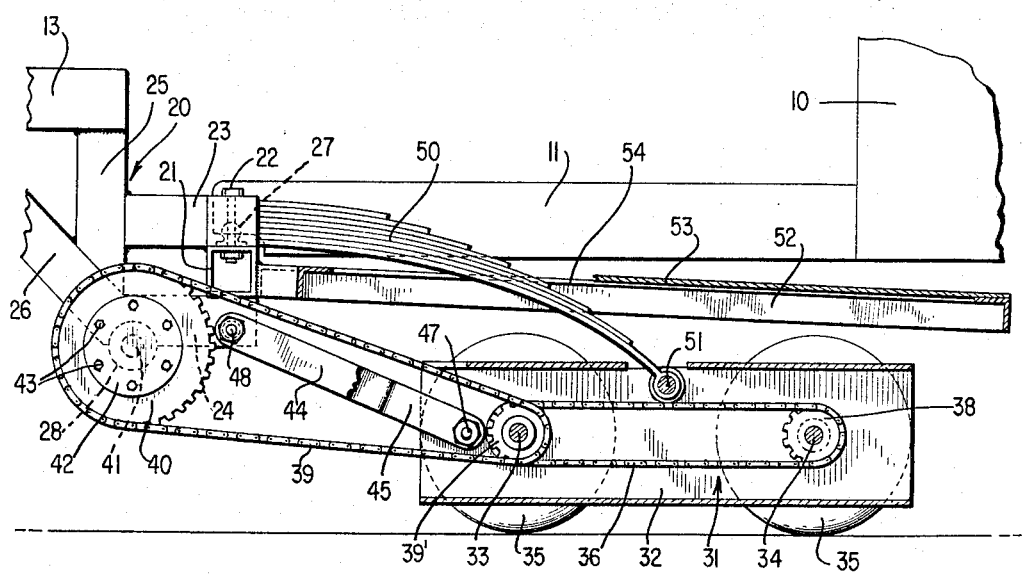

The braking system for the towing vehicle has been purposely omitted from the drawings for simplicity of illustration and because the brakes may be substantially conventional. With reference to FIGURES 3 and 4, it is perfectly apparent that suitable brake shoe assemblies hydraulically actuated or otherwise, may be secured to the outer sides of the carriage frames 32 inwardly of the wheels 35 and surrounding the powered axles 33 and 34, for cooperation with the usual brake drums on the wheels 35, not shown. Pneumatically operated or vacuum brakes or mechanical brakes may also be employed as found desirable.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A towing vehicle for a trailer having a low elevation draft tongue comprising an automotive truck chassis including a conventional height main frame which is cut off near and behind the truck transmission, a depressed frame extension on the rear of the cut off main frame including a hitch bar adapted to underlie and support the trailer tongue at an elevation substantially below the main frame, a pair of traction wheel units trailing from opposite sides of the depressed frame portion in laterally separated relation and hingedly coupled thereto and being of a sufficiently low height to be bodily beneath the elevation of said draft tongue, springs interconnecting the traction wheel units and depressed frame extension to resist upward movement of the former resiliently, each of said traction wheel units including a low frame, a pair of tandem axles having wheels on said low frame, said springs being leaf springs, and means on each low frame for coupling one of said springs to the low frame centrally thereof and between the tandem axles thereof, the forward end of each leaf spring secured to the depressed frame extension, and gearing connected with the depressed frame extension and driven by said truck transmission and drivingly connected with the tandem axles of said traction wheel units.

2. A towing vehicle for trailers having low bottoms and low draft tongues comprising an automotive truck chassis having conventional full size front wheels and a conventional engine and transmission and a foreshortened main frame of conventional height, a depressed hitch frame on the rear of the foreshortened main frame for coupling engagement with the forward end of a trailer tongue, gearing on said depressed hitch frame operatively connected with and driven by said transmission, low silhouette four wheel drive traction wheel units trailing from and connected with said depressed hitch frame, flexible gearing drivingly interconnecting the first-named gearing and the wheels of said four wheel drive traction units, said depressed hitch frame having laterally spaced socket openings at its rear end, leaf springs extending over said traction wheel units and having their rear ends connected therewith and their forward ends anchored within said socket openings, and mud guards overlying said traction wheel units and secured to said depressed hitch frame and having openings receiving said springs, said mud guards being at an elevation below said tongue.

3. A towing vehicle particularly for towing a large mobile home of the type having a low ground clearance of approximately 16 inches when level, said mobile home having a front draft tongue substantially at said ground clearance elevation, said towing vehicle comprising an automotive truck chassis having an engine and transmission and a conventional height main frame having a depressed portion thereon near and rearwardly of the transmission, a hitch means on the depressed portion substantially at the transverse center of the towing vehicle and substantially at said low ground clearance elevation, a pair of laterally spaced rear wheel units for the towing vehicle pivotally secured independently in trailing relation to said depressed portion near the opposite sides of the towing vehicle, each wheel unit including its own wheel and axle means separate from and independent of the wheel and axle means of the other unit, whereby a completely unobstructed longitudinal passage is formed between said wheel units rearwardly of the depressed portion and hitch means, said wheel units having an overall height of less than said low ground clearance elevation, and springs interconnecting said wheel units and depressed frame portion.

4. The invention as defined by claim 3, and power transmitting gearing interconnecting said transmission and the wheel and axle means of said rear wheel units.

5. A towing vehicle particularly for towing mobile homes of the type having a floor and front end draft tongue which clear the ground when level by approximately 16 inches, said towing vehicle comprising a truck chassis having a conventional height main frame and an engine and transmission on the forward portion of the main frame, said main frame severed near the rear of said transmission, a depressed frame extension on the rear of the severed main frame substantially below the elevation of the latter and having a hitch means thereon substantially at the transverse center of the vehicle adapted to be coupled with said draft tongue while the tongue is substantially level to then support the draft tongue at an elevation substantially below the main frame, a pair of traction wheel units secured in trailing relation to said depressed frame extension on opposite sides of the hitch means and being laterally spaced, said units having separated independent axle means so that a completely unobstructed passage is provided between the units from the depressed frame extension and hitch means rearwardly, said units thereby adapted to pass on opposite sides of a stationary supporting structure for said tongue when hitching the tongue to the towing vehicle, said wheel units being sufficiently low in overall height to be adapted to pass bodily under said tongue and floor during turning, and driving connecting means between said transmission and wheel units.

6. The invention as defined by claim 5, and wherein said driving connecting means includes a differential gear device in the power path between said transmission and said pair of traction wheel units.

7. The invention as defined by claim 5, and wherein said hitch means is spaced substantially forwardly of said pair of traction wheel units, whereby weight on the hitch means is concentrated forwardly of the wheel units on the towing vehicle.

8. A towing vehicle particularly for towing large mobile homes of the type having a floor and front end draft tongue which are approximately 16 inches above the ground when the tongue is level, said towing vehicle comprising an automotive truck chassis having a conventional height main frame and an engine and transmission on the forward portion thereof, said main frame severed near and rearwardly of said transmission, a depressed frame extension mounted on the rear of the severed main frame and projecting a short distance rearwardly thereof and having a hitch device thereon substantially at the transverse center of the towing vehicle, said hitch device positioned substantially at said above ground distance, a pair of traction wheel units secured in trailing relation to said frame extension near the opposite sides of the towing vehicle and supporting the rear of the latter and being spaced apart laterally on opposite sides of the hitch device and bodily rearwardly of the hitch device, each unit having wheel and axle means separated from and independent of the wheel and axle means of the other unit, whereby an unobstructed passage is provided between said units from the rear of the towing vehicle forwardly to the depressed frame extension and hitch device, said units having an overall height less than said above ground distance, and gearing drivingly interconnecting said transmission and traction wheel units and including a differential device.

9. A towing vehicle for low ground clearance trailers having low elevation draft tongues comprising a foreshortened automotive truck chassis having a conventional engine and transmission and main frame and front wheels, said main frame being severed rearwardly of and close to said transmission, a depressed frame extension on the back of said main frame, a differential gear and driving axle unit on said main frame, means drivingly interconnecting said transmission and the differential gear of said unit, a pair of low silhouette wheeled traction units having overall heights of less than said ground clearance, said units arranged in trailing relation to the depressed frame extension and connected therewith and spaced apart laterally in parallel relation near the opposite sides of the main frame, gearing drivingly interconnecting said differential gear and driving axle unit and said wheeled traction units to power the latter, and buffer frames also serving as mud guards immediately above said wheeled traction units, said buffer frames having their forward ends secured to said depressed frame extension and being bodily carried thereby.

10. A towing veracle for large type mobile homes comprising a chassis having a frame, a depressed extension on the rear end of said chassis frame, a weight-supporting swivel-type hitch device on said depressed extension near the transverse center of the vehicle, a pair of distinct and laterally separated supporting wheel units pivotally connected with and trailing from said depressed extension on opposite sides of the hitch device and spaced bodily rearwardly of the hitch device so that weight borne by said hitch device is concentrated forwardly of and substantially midway between said wheel units, there being an unobstructed passage between said wheel units extending from the hitch device rearwardly through the rear end of said vehicle, and resilient means interconnecting each wheel unit with said frame.

References Cited by the Examiner

UNITED STATES PATENTS

| 1,296,655 | 3/1919 | Gurney | 180—14 |
| 1,880,123 | 9/1932 | Davis et al. | 280—408 |
| 1,914,266 | 6/1933 | Leupold | 180—22 |
| 2,302,246 | 11/1942 | Nelson | 280—476 |
| 2,459,965 | 1/1949 | Robertson | 280—489 |
| 2,706,059 | 4/1955 | Parker | 280—423 |
| 2,884,870 | 5/1959 | Day | 280—423 X |
| 2,918,302 | 12/1959 | Hartenstine | 280—423 X |
| 3,066,955 | 12/1962 | Brockman | 280—423 |

FOREIGN PATENTS

| 2,941 of 1912 | 1/1913 | Great Britain. |
| 515,238 | 11/1920 | France. |
| 835,466 | 9/1938 | France. |
| 1,007,636 | 5/1957 | Germany. |

BENJAMIN HERSH, *Primary Examiner.*

R. C. PODWIL, C. C. PARSONS, *Assistant Examiners.*